Oct. 18, 1932.    M. J. MARTIN ET AL    1,883,805
FILTRATION OF WATER
Filed Oct. 15, 1929    4 Sheets-Sheet 1

M. J. Martin &
W. R. Jerry INVENTORS

By Marks & Clerk
Attys.

Oct. 18, 1932.   M. J. MARTIN ET AL   1,883,805
FILTRATION OF WATER
Filed Oct. 15, 1929   4 Sheets-Sheet 2

INVENTORS:
M. J. Martin &
W. R. Jerry

By: Marts & Clark
Attys.

Oct. 18, 1932.  M. J. MARTIN ET AL  1,883,805
FILTRATION OF WATER
Filed Oct. 15, 1929   4 Sheets-Sheet 4

M. J. Martin and W. R. Terry
Inventors
By: Marks & Clerk
Attys.

Patented Oct. 18, 1932

1,883,805

UNITED STATES PATENT OFFICE

MICHAEL JAMES MARTIN, OF ARMADALE, VICTORIA, AND WALTER REGINALD TERRY, OF KOOYONG, VICTORIA, AUSTRALIA, ASSIGNORS TO FILTRATION AND WATER SOFTENING PROPRIETARY LIMITED, OF MELBOURNE, AUSTRALIA, A COMPANY OF VICTORIA, AUSTRALIA

FILTRATION OF WATER

Application filed October 15, 1929, Serial No. 399,844, and in Australia October 29, 1928.

This invention relates to improvements in and connected with the filtration of water and refers especially to improvements in filters of the "pressure" type.

Pressure filters are adapted to be connected directly to pipe lines operating under pressure in order to purify water for domestic and industrial purposes, and such filters generally comprise a chamber provided with a bed of graded granulated material, such as sand and gravel, of approved depth.

Crude water is delivered to the top of the chamber above the filter bed and a pipe is provided for discharging the purified water from the bottom of the chamber. Before delivering the crude water to the filter chamber it is customary to coagulate the impurities (which may be partly colloidal and partly in true solution) by treatment with aluminium sulphate and/or sodium carbonate or other approved coagulants.

During the operation of the filter, the upper portion of the bed becomes coated with a film or layer of "floc" comprising the precipitated impurities. This film plays an important part in the filtering operation but, as the action is progressive, the resistance of the bed increases with the period of operation, thus causing an increased pressure difference thereacross.

When, however, the pressure difference exceeds a certain magnitude, disruption of the film may occur with consequent loss of efficiency, and before this condition occurs, the filter bed requires cleaning.

It is found in practice that it is not advisable to allow this drop in pressure to exceed about 6 to 10 lbs. to the square inch and to obviate this occurrence, pressure gauges are sometimes placed at the top and bottom of the filter bed so as to indicate the difference of pressure, and an alarm or like device has been associated therewith to attract the attention of an attendant when the bed requires cleaning.

The cleansing of the filter bed may be effected in different ways, such as by a reverse flow of the water with mechanical agitation, or by agitation with air followed by a reverse flow of water, or by an upward flow of water at a relatively high velocity.

The cleaning operation is usually effected by the last-mentioned method known as the "high velocity" wash, wherein filtered water is forced in a reverse direction through the filter bed at a relatively high velocity thus causing the "floc" and scum to be discharged to waste through pipes provided therefor.

This prefiltered water may be stored in an elevated tank so that its own head will force it through the filter bed or alternatively a pump or injector may be employed for this purpose.

It has been found in practice that for efficient cleansing the velocity of the reverse flow should be from four to six times the normal downward flow for filtration, in order that the constituents of the filter bed will be substantially held in suspension by the upward current.

Now, the object of the present invention is to provide improvements in pressure filters by means of which the disruption of the film or "floc" will be prevented and whereby the cleaning of the filter bed may be readily and effectively accomplished when desired without employing storage tanks, injectors or pumps.

We accomplish these objects by providing a pressure filter having means for preventing the drop in pressure across the bed exceeding a predetermined maximum.

The filter preferably comprises a plurality of individual units so arranged that the combined flow of filtered water from a number of such units may be utilized for cleansing one or more of the remaining units.

More particularly a pressure filter constructed in accordance with the present invention comprises a plurality of filter chambers provided with beds of granulated material, a crude water main communicating with the upper ends of the filter chambers, a discharge pipe associated with the lower ends of said chambers, one or more valves adapted to prevent the pressure drop across the bed or beds exceeding a predetermined maximum, and valve mechanism associated with the upper ends of the filter chambers and adapted to be actuated to successively open said chambers to waste, whereby when one of such chambers is opened, the filtered water discharged from the lower ends of the remaining chambers will be caused to pass upwardly therethrough at a relatively high velocity.

The coagulant or coagulants is or are maintained in a saturated condition in one or more chambers associated by means of passages with a venturi constriction in the crude water main whereby coagulant will be injected into the crude water in proportion to the volume thereof being treated.

When desired, the crude water, after treatment with the coagulant and before delivery to the filter beds, may be passed through an agitation chamber of approved type in order to ensure the effective coagulation of the impurities.

In order that the invention, the object and nature of which have been set forth, may be readily understood, reference will now be had to the accompanying sheets of explanatory drawings wherein:—

Figure 1:
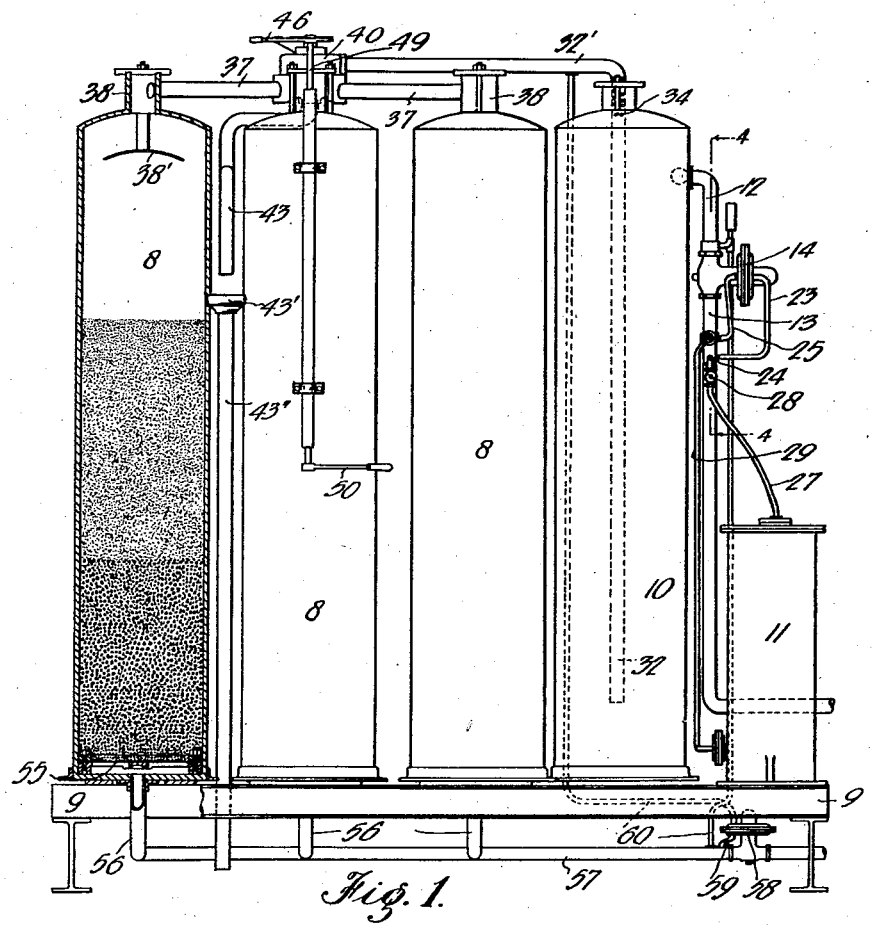
Figure 1 is a view in side elevation (partly in section) of a pressure filter constructed in accordance with the present invention.

In these drawings which portray, by way of example only, one approved arrangement of a pressure filter constructed in accordance with the invention, the reference numeral 8 designates a plurality of vertically disposed cylindrical filter chambers which are preferably arranged in two rows as shown and supported on suitable supports 9.

In the plant illustrated, an agitation chamber 10 is mounted on the supports 9 at one end of the group of filter chambers, but, as hereinafter described, this chamber may be dispensed with when desired.

A pair of smaller chambers 11 also supported on the supports 9 are adapted to contain saturated solutions of coagulants, such as sulphate of alumina and sodium carbonate.

The crude water is adapted to be delivered to the upper end of the agitation chamber by means of a pipe 12 associated with a water main or the like. This crude water pipe is provided with a venturi element 13 arranged above the level of the chambers 11 and a rate-control valve 14 is also provided in the pipe 12. The rate-control valve 14 is preferably of the balanced type and an approved construction thereof is illustrated in greater detail in Figure 7 of the drawings.

The casing 15 of the rate-control valve is provided at its upper and lower ends with screwed openings by means of which it is secured to the crude water pipe 12 and venturi element 13 respectively, and an integrally formed central chamber 16 is provided with opposed valve seats 17 adapted to be engaged by valves 18 secured to a horizontally disposed valve rod 19 suitably guided in the casing.

The valve casing 15 is secured to a diaphragm chamber 20 between the sections of which a flexible diaphragm 21 is securely clamped. The valve rod 19 passes centrally through the flexible diaphragm and is fitted with a pair of discs 22 arranged on opposite sides of the diaphragm and secured rigidly in position thereon.

The outer end of the valve rod passes through the diaphragm chamber and is surrounded by a compression spring 19' the outer end of which bears against an adjustable collar 19" of which the pressure of said spring, tending to open the valve, may be varied as desired.

Figure 4:
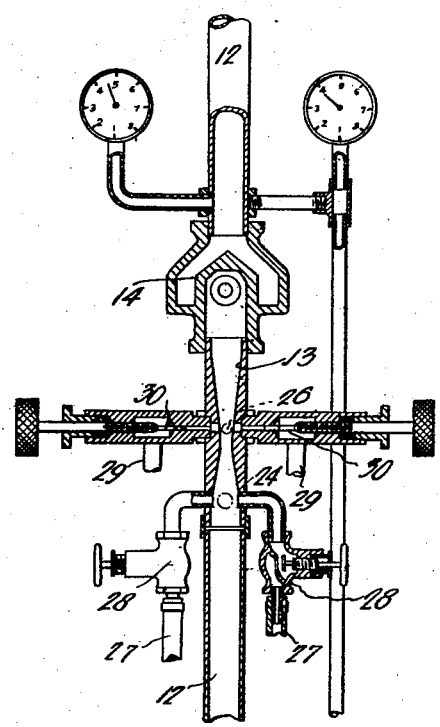
Figure 4 is a view in sectional elevation taken on the dotted line 4—4 of Figure 1.
Figure 5:
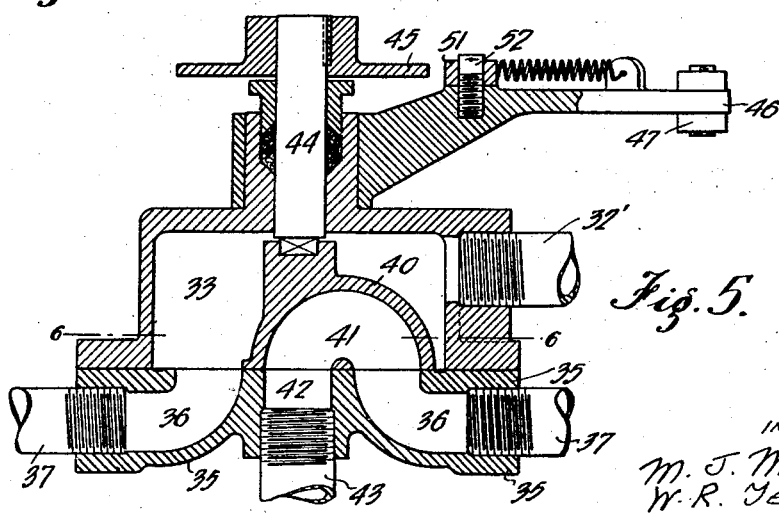
Figure 5 is a view in sectional elevation of a valve for controlling the distribution of water to the filter chambers.
Figure 6:
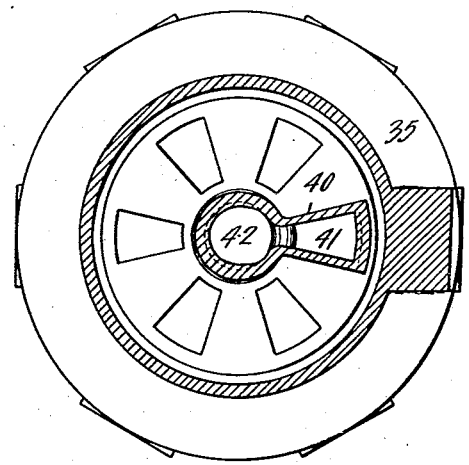
Figure 6 is a view in sectional plan taken on the dotted line 6—6 of Figure 5.

The outer side of the diaphragm chamber 20 communicates by means of a pipe 23 with the high pressure zone of the venturi element at 24 (Figure 4); whilst the inner side of the chamber is connected by means of a pipe 25 to the lower pressure or central zone of the venturi element as at 26 (Figure 4).

It will be understood that, as the velocity of water passing through the venturi constriction increases beyond a predetermined magnitude, determined by the compression of the spring 19', the valves 18 will commence to close, thus throttling the supply and tending to maintain a uniform rate of delivery to the filter chambers 8.

The upper ends of the coagulant chambers 11 are connected by means of pipes 27 provided with valves 28 to the high pressure zone of the venturi element, whilst the lower ends of said chambers are connected by means of pipes 29 to valve chambers communicating with the constricted portion of the venturi element.

These valve chambers are fitted with needle valves 30 by means of which the amount of coagulant injected may be accurately controlled.

The pipes 29 are provided near their lower ends with strainers 29' by means of which solid particles of coagulant and impurities are prevented from passing into the raw water.

In normal operation, the valves 28 are maintained open so that the coagulant in the chambers 11 is maintained in a saturated condition. It will thus be understood that there is a continuous injection of coagulant into the raw water at the venturi constriction and that the amount thereof can be controlled by means of the needle valves 30.

As previously stated, the raw water passes from the crude water pipe 12 into the upper end of an agitation chamber 10.

Figure 2:
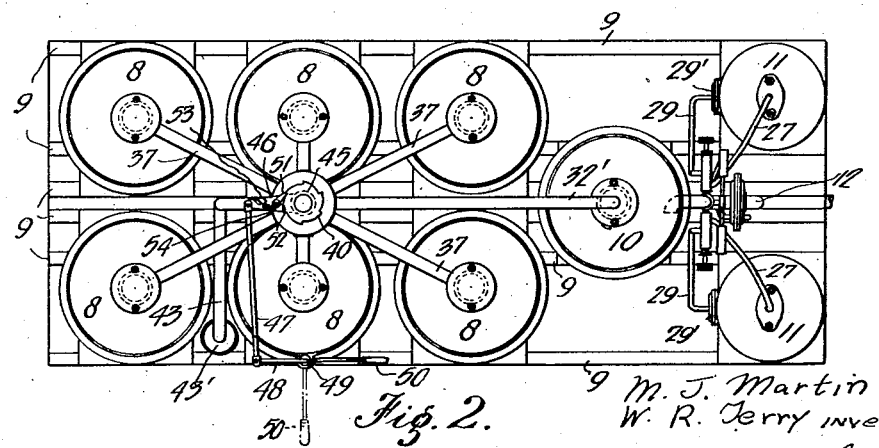
Figure 2 is a view in plan of the filter shown in Figure 1.
Figure 3:
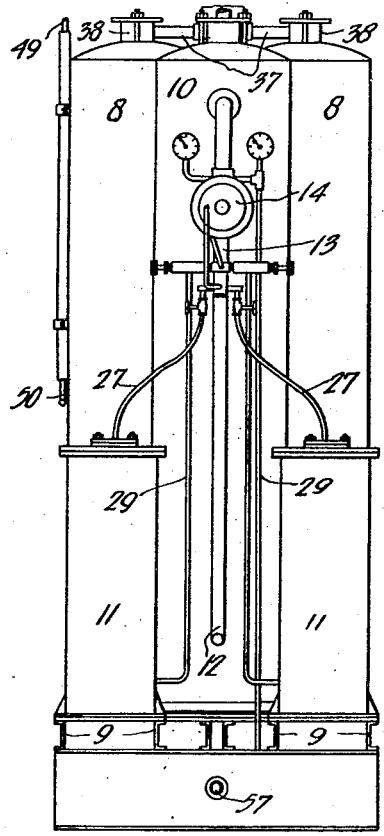
Figure 3 is a view in end elevation of the filter.

In order to cause the water to swirl around the chamber and ensure a thorough agitation, the end of the pipe 12 is preferably arranged tangentially within the agitation chamber as shown in plan in Figure 2 of the drawings.

The agitation of the water in the chamber 10 ensures the effective coagulation of impurities and need only be used when it is found that coagulation is not sufficiently complete when the water is passed direct from the coagulant injecting device to the filter chambers.

A discharge pipe 32 is arranged centrally within the closed agitation chamber, the lower end thereof being opened and disposed near the lower end of the chamber.

The upper end of the pipe 32 passes through the top of the chamber 10 to a supply pipe 32' which passes to the chamber 33 of a distribution valve 40.

In order to prevent the accumulation of gas at the top of the agitation chamber, the pipe 32 is preferably provided near its upper end with a plurality of holes 34 adapted to permit of the passage of gas into the discharging water.

The chamber 33 is secured rigidly to a base member 35, the upper surface of which functions as a valve seat and is provided with a plurality of radially disposed segmental shaped ports equal in number to the filter chambers.

Passages 36 communicating with the said ports are connected by means of pipes 37 to centrally disposed necks 38 formed on the upper ends of the filter chambers 8 and provided with detachable cover plates 39.

Perforated baffles 38' are preferably arranged within the filter chambers 8 below the necks 38.

A rotary valve 40 arranged within the distribution chamber engages the seat on the base member 35 and said valve is provided on its underside with a passage 41 the outer portion of which conforms in shape to the ports in the valve seat.

The inner end of the passage 41 is in constant communication with a centrally disposed opening 42 communicating with a discharge pipe 43 the lower end of which terminates above a funnel 43' fitted to the upper end of a waste pipe 43'' disposed in any convenient position whereby the attendant when washing the filter beds may observe the discharging water.

In order to prevent the formation of a gas pocket in the top of the chamber 33, a float operated relief valve (not indicated in the drawings) may be provided for discharging any excess of gas.

The valve 40 is so designed as to be capable of being located between any pair of the ports without interfering with the flow thereto.

The valve 40 is provided with an upwardly extending boss having a square recess adapted to accommodate the correspondingly shaped end of a short vertical spindle 44 passing upwardly through a packing gland in the casing 33.

The projecting upper end of the spindle is fitted with a ratchet having one tooth for each of the filter chambers in the plant. An oscillatable lever 46 is mounted concentrically about the spindle 44 and its free end is connected by a link 47 to a lever 48 on the upper end of a vertical spindle 49 mounted in bearings adjacent to one of the filter chambers 8. The lower end of the spindle 49 is fitted with an operating lever 50. A pawl 51 adapted to engage the teeth of the ratchet 45 is pivotally mounted on a pin 52 secured to the lever 46 and a tail 53 on the pawl is connected by means of a spring 54 to the said lever whereby the pawl is maintained in engagement with the ratchet.

It will be understood that, when the operating lever 50 is moved through an arc of 180° from the position indicated in full lines in Figure 2, the valve 40 is displaced from one port to the adjacent port. If, however, the operating lever is moved into the position indicated in broken lines in the figure, the valve 40 will be disposed in its normal or inoperative position intermediate a pair of ports.

The filter beds are supported on perforated plates 55 arranged adjacent the lower ends of the filter chambers 8 and individual discharge pipes 56 passing from the center of the chamber communicate with a common discharge pipe 57 by means of which the purified water is conveyed to any desired position.

The central portions of the perforated discs or plates 55 are preferably concaved on their under sides above the discharge pipes in order to distribute the wash water which, as hereinafter described, passes upwardly through the respective individual discharge pipe 56 at a relatively high velocity.

Figure 7:
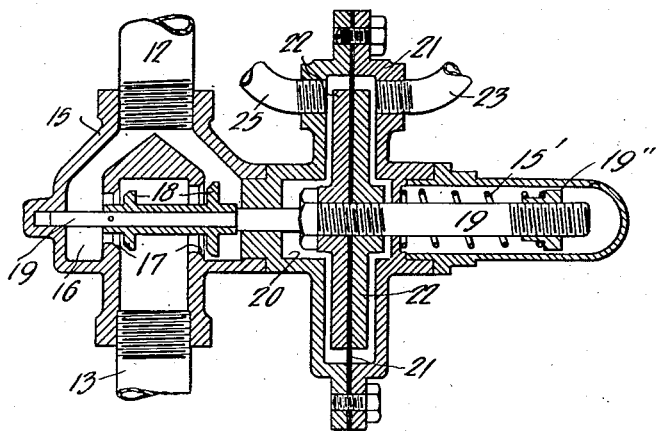
Figure 7 is a view in sectional elevation of a valve the function and operation of which is hereinafter set forth.

A cut-out valve 58 which may be of the type illustrated in Figure 7 and described with reference thereto is arranged in the common discharge pipe 57. The function of this valve is to throttle the flow of water when the pressure drop between the common inlet and discharge pipes of the filter chambers reaches a predetermined magnitude and so prevent the pressure drop exceeding that amount. For this purpose the inner side of the diaphragm chamber of the cut-off valve communicates by means of a pipe 59 with the common discharge pipe 57 whilst the opposite side thereof communicates by means of a pipe 60 with the supply pipe 32'.

The pressure of the control spring is adjusted by the nut 19" in the manner previously described whereby the valve commences to close when the pressure difference reaches a predetermined magnitude; for example, about six pounds to the square inch.

It will be understood that with a valve of this type the flow of water will never be completely cut off although the rate of flow will be very considerably reduced in order to prevent the drop in pressure across the filter bed exceeding the predetermined amount. If desired a valve which will completely prevent the flow of water may be employed.

In operation, crude water passes from a water main or the like through the crude water main 12. In passing through the venturi element 13, the necessary amount of saturated solution of coagulant or coagulants is or are injected into the liquid by means of the apparatus above described.

After passing through the rate-control valve, the treated water is delivered to the agitation chamber 10 when one of these devices is employed.

It will be understood from the foregoing description that the rate-control valve tends to maintain a uniform rate of flow through the filter plant irrespective of the resistance of the filter beds.

The agitation chamber ensures the effective coagulation of the impurities in the water in such cases where "floc" formation is not sufficiently complete when the water passes direct from the injecting apparatus to the filter chambers.

The treated water entering the distribution chamber 33 passes through the ports therein into the various filter chambers, it being understood that the valve 40 is inoperative owing to its being disposed intermediate any pair of such ports.

The filtered water passing from the lower ends of the beds enters the individual discharge pipes and passes therefrom to the common discharge pipe 57.

During the operation of the filter "floc" accumulates on the top of the beds and increases the resistance thereof with the result that the pressure difference between the upper and lower ends of the filter chambers increases progressively with the period of operation.

When, however, the pressure drop reaches a predetermined amount, the cut-off valve 58 automatically commences to close and throttle the flow of water by reason of the pressure on the outer side of the diaphragm being greater than the combined pressure of the spring and the pressure on the inner side of the diaphragm. In this manner an excessive pressure difference across the filter beds is positively prevented.

If desired, a suitable switch may be associated with the cut-off valve whereby an alarm or signal will be operated when the plant automatically shuts off, thereby calling the attendant to wash the plant.

As previously stated, when the valve 40 is in its inoperative position, the operating handle 50 is disposed in the position indicated in chain dotted lines in Figure 2 of the drawings.

When the operating lever is moved 90° in the direction of the arrow in Figure 2, the valve 40 is displaced to cover one of the valve ports, thereby placing the upper end of the respective filter chamber into communication with the discharge pipe.

The back pressure in the common discharge pipe 57 exceeds the resistance of the filter bed in communication with the discharge pipe 43, thus resulting in the filtered water from the remaining chambers 8 passing upwardly through the single unit.

When the normal load on the plant does not cause sufficient back pressure in the common discharge pipe to ensure the washing of the filter beds in the manner set forth, a load valve of approved type is preferably provided for this purpose.

As the combined flow from five of the units is employed to wash a single unit (in the construction shown in the drawings) the washing velocity is about five times the velocity of filtration, this relatively high washing velocity being sufficient to ensure a thorough cleansing of the filter bed and the removal of the scum from the upper surface thereof.

When the water passing from the lower end of the discharge pipe 43 above the funnel 43' is clear, the washing is complete and the operating handle, after being moved back through an arc of 180° into the position indicated in full lines in Figure 2, whereby another tooth of the ratchet is engaged, is again moved in the direction of the arrow to place the valve 40 into communication with the next port, thereby enabling the filter chambers to be successively washed.

When all the chambers in the plant have been cleansed, the valve 40 is placed in an inoperative position by moving the operating lever from the position shown in full lines in Figure 2 to the position indicated in broken lines.

It is found in practice that the filter chambers require washing at fairly regular intervals and this may be carried out by means of an attendant without awaiting the operation of the cut-off valve 58.

A salient feature of the present invention consists in throttling the wash water on the discharge side of the filter chamber being cleansed—that is by providing the valve at the upper instead of at the lower end of the filter chamber as is the case with single chamber pressure filters as at present constructed.

By arranging the valve on the discharge end instead of on the inlet end (that is when the chamber is being cleansed) the back pressure in the chamber is sufficient to ensure an even distribution of wash water entering the lower end of the chamber, even when the valve is throttling the flow thereof.

In lieu of employing a common distribution valve for the crude water passing through the filter chambers, separate valves may be arranged at the top of each chamber and adapted to place the same into communication with the crude water supply or the discharge pipe 43 as desired.

Likewise, in lieu of employing one cut-off valve in the common discharge pipe 57, separate cut-off valves may be arranged at the lower end of each of the filter chambers 8.

The cut-off valve 58 may be of any approved type and, if desired, may be operated by means of a solenoid adapted to be controlled by a relay associated with a mercury monometer connected at its opposite ends to the common inlet and discharge pipes.

Likewise, the rate control valve 14 may be of any approved type and, in lieu of employing a spring for controlling the action thereof, a suitably arranged weight may be provided.

If preferred, the distribution valve 40 may be associated by means of gearing with an electric motor (not illustrated in the drawings) and provided with a switch operable by means of the cut-out valve 58.

The gearing associating the electric motor with the distribution valve may be arranged so as to cause the said valve to slowly make one complete revolution, thereby successively cleansing all the filter chambers in the plant before being restored to its normal position.

It will be obvious that, when means as above described is provided for automatically actuating the distribution valve when the pressure drop across the filter bed has a predetermined value, the cut-off valve 58 may be dispensed with.

Figure 8:
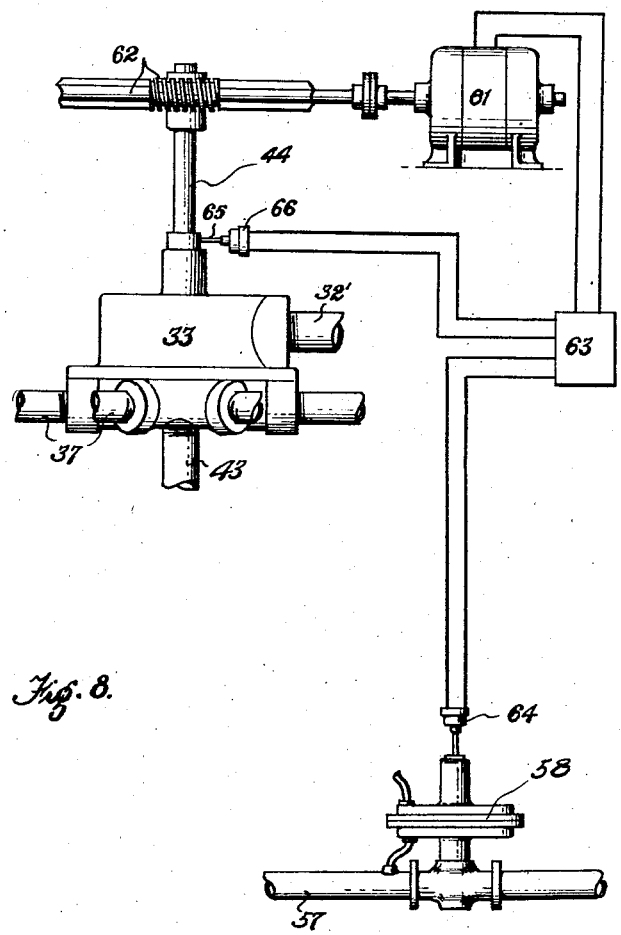
Figure 8 is a diagrammatic view showing means for automatically washing the filter beds when the pressure drop thereacross reaches a predetermined magnitude.

One suitable construction for automatically effecting the washing of the filter chambers is illustrated in Figure 8, wherein an electric motor 61 is associated by means of worm and worm wheel, reduction gearing 62 with the spindle 44 of the valve 40 in the distribution chamber.

The circuit of the electric motor is controlled by means of a magnetic switch 63 of known construction under the control of a relay.

The cut off valve is associated with a switch 64 for the relay, whereby when the cut off valve closes to a predetermined extent the switch 64 for the relay is closed, which in turn effects the closure of the main switch 63 to start the motor.

The valve 40 then rotates slowly so that the filter chambers are washed successively, and when one complete revolution has taken place a radial projection 65 on the spindle 44 momentarily engages a switch 66 to de-energize the relay and open the switch 63 of the motor.

Owing to the fact that the filter beds usually require washing at fairly regular intervals, the motor for operating the distribution valve may, if desired, be controlled by a time switch adapted to operate the valve to successively cleanse all the filter chambers at regular intervals of time.

The use of a coagulant will, of course, depend upon the nature of the water to be filtered and upon the degree of filtration required. Initial filtration, for example, may be carried out without the use of a coagulant in which case the filter beds are used more or less in the nature of strainers.

Furthermore, it will be appreciated that means other than those described and illustrated may be provided for treating the crude water with a coagulant which, if desired, may be used in a solid condition.

A master reducing valve (not indicated in the drawings) may be provided in the crude water supply pipe 12 in order to maintain a substantially constant pressure thereon.

Whilst preferred forms of the invention have been set forth herein, modifications and rearrangements of the apparatus may be effected without departing from the essential characteristics of the invention and we, therefore, do not wish to be understood as limiting ourselves by the specific terms of the description.

We claim:

1. In a pressure filter, a plurality of chambers provided with filter beds, a distribution chamber associated with a crude water main and provided with a valve seat, a plurality of radially disposed ports in the valve seat, a central port open to waste, supply passages connecting the inlet ends of the filter chambers with the radially disposed ports, a rotary valve engaging the valve seat in the distribution chamber adapted to be actuated to place any of the ports in communication with the waste port and simultaneously cut off the crude water supply thereto, connected discharge passages at the lower ends of the chambers, and automatic valve mechanism in the discharge passage controlled by the pressure drop across the filter beds whereby when the pressure drop between the common inlet and discharge pipes of the filter chambers reaches a predetermined magnitude, the valve mechanism commences to close to prevent a further increase in the pressure difference.

2. In a pressure filter, a plurality of chambers provided with filter beds, a crude water supply pipe, a distribution chamber in the supply pipe, a valve seat in the distribution chamber, a plurality of radially disposed ports in the valve seat communicating with the supply passages, a central port open to waste, and a rotary valve engaging the valve seat and adapted to be actuated to place any of the radially disposed ports into communication with the central port, and means for actuating the said valve.

3. In a pressure filter, a plurality of chambers provided with filter beds, a distribution chamber associated with a crude water main and provided with a valve seat, a plurality of radially disposed ports in the valve seat, a central port open to waste, supply passages connecting the inlet ends of the filter chambers with the radially disposed ports, a rotary valve engaging the valve seat in the distribution chamber adapted to be actuated to place any of the ports in communication with the waste port and simultaneously cut off the crude water supply thereto, a spindle fitted to the valve and projecting through the distribution chamber, a ratchet fitted to the projecting end of the spindle, a lever oscillatively mounted adjacent the ratchet, a pawl on the lever adapted to engage the ratchet, means for oscillating the lever to impart movement to the valve, connected discharge passages at the lower ends of the chambers, and automatic valve mechanism in the discharge passage controlled by the pressure drop across the filter beds whereby when the pressure drop between the common inlet and discharge pipes of the filter chambers reaches a predetermined magnitude the valve mechanism commences to close to prevent a further increase in the pressure difference.

4. In a pressure filter according to claim 2, wherein the means for actuating the rotary valve includes a spindle fitted to the valve and projecting through the distribution chamber, a ratchet fitted to the projecting end of the spindle, a lever oscillatively mounted adjacent the ratchet, a pawl on the lever adapted to engage the ratchet, a vertical oscillatable spindle, an operating handle on the spindle, a lever on the spindle, and a link connection between the last mentioned lever and the oscillatable lever.

In witness whereof we hereunto affix our signatures.

MICHAEL JAMES MARTIN.
WALTER REGINALD TERRY.